United States Patent

Murakami et al.

[11] Patent Number: 6,054,826
[45] Date of Patent: Apr. 25, 2000

[54] BACKWARD DRIVE CONTROL SYSTEM FOR MOTORCYCLE

[75] Inventors: Ryuichi Murakami, Ichinomiya; Akira Shinoda, Kuwana; Hiroo Utsumi, Obu; Kazunori Ozawa, Nagoya, all of Japan

[73] Assignee: Denso Corporation, Kariya, Japan

[21] Appl. No.: 09/383,993

[22] Filed: Aug. 26, 1999

[30] Foreign Application Priority Data

Sep. 9, 1998 [JP] Japan ................. 10-254773

[51] Int. Cl.⁷ .................................. F02N 11/10
[52] U.S. Cl. ................. 318/471; 318/434; 318/452; 318/473; 318/484; 74/6; 361/25; 361/28
[58] Field of Search .................... 318/244, 245, 318/246, 432, 433, 434, 452, 453, 454, 463, 471, 473, 484; 388/903, 921, 934; 290/28, 38 R, 48; 180/65.2, 220; 74/6; 361/23, 24, 25, 28

[56] References Cited

U.S. PATENT DOCUMENTS

| | | | |
|---|---|---|---|
| 4,683,777 | 8/1987 | Nakayama | 74/850 |
| 4,827,148 | 5/1989 | Hirosawa et al. | 290/38 R |
| 4,869,332 | 9/1989 | Fujita et al. | 180/65.2 |
| 5,024,113 | 6/1991 | Ito et al. | 74/6 |
| 5,770,901 | 6/1998 | Niimi et al. | 310/52 |

FOREIGN PATENT DOCUMENTS 60-243364  12/1985  Japan.

*Primary Examiner*—Bentsu Ro
*Attorney, Agent, or Firm*—Pillsbury Madison & Sutro LLP

[57] ABSTRACT

Backward movement of a heavy motorcycle is assisted by a starter motor for cranking an engine of the motorcycle. A backward drive control system includes a pulse width modulation circuit for supplying operating current to the starter motor in a controlled manner and a device for estimating operating temperature of the starter motor based on the current supplied to the starter motor. When the estimated temperature reaches a predetermined maximum temperature, the operation of the starter motor is compulsorily stopped and prohibited for a certain period or until the starter motor is cooled down to a certain temperature level. Overheating of the starter motor is effectively prevented without using a temperature sensor for measuring the operating temperature.

Moreover, chattering of the starter motor does not occur because its operation is prohibited for a certain period after the starter motor is once compulsorily stopped.

12 Claims, 7 Drawing Sheets

BACKWARD DRIVE CONTROL SYSTEM FOR MOTORCYCLE

CROSS-REFERENCE TO RELATED APPLICATION

This application is based upon and claims benefit of priority of Japanese Patent Application No. Hei-10-254773 filed on Sep. 9, 1998, the content of which is incorporated herein by reference.

BACKGROUND OF THE INVENTION

1. Field of the Invention

The present invention relates to a system for controlling backward drive of a motorcycle which is able to be driven backward by operation of a starter motor.

2. Description of Related Art

Usually, a motorcycle can be moved backward only by manual power of a driver. However, if a motorcycle is big and heavy, it is hard to manually move it backward. There is a type of motorcycle that includes a device to drive it backward by operation of a starter motor which is primarily for cranking its engine. Since the starter motor is originally designed to start up the engine with a high current in a short period of time, its operating temperature tends to rise to an intolerable level if it is operated for a longer period than usually required to start up the engine. If its operating temperature becomes excessively high, the starter motor may be damaged by burning-out of its brushes, for example. To cope with this problem, a larger size starter is conventionally used in the device for driving the motorcycle backward. It is not desirable, however, to use a larger size starter motor from standpoints of its installation space, weight and cost.

SUMMARY OF THE INVENTION

The present invention has been made in view of the above-mentioned problem, and an object of the present invention is to provide an improved control system for backward drive of a motorcycle, and more particularly to make it possible to use a regular size starter motor in such a system by limiting operating temperature rise.

Usually a motorcycle is moved backward manually by a driver. However, it is hard to move a big and heavy motorcycle backward with human power. Since a big motorcycle is equipped with a starter motor for starting its engine, the starter motor can be utilized as an assisting power to move the motorcycle backward. When the starter motor is used to drive the motorcycle backward, its operation has to be properly controlled to prevent overheating of the starter motor that is designed to be operated only in a short time.

A backward drive control system according to the present invention includes a pulse width modulation circuit for supplying backward driving current to the starter motor in a controlled manner, a current detecting circuit for detecting the current supplied to the starter motor, and a control circuit. The control circuit includes a microcomputer that controls the pulse width modulation circuit and estimates operating temperature of the starter motor based on the starter current detected by the current detecting circuit. During the backward drive operation, when the estimated operating temperature of the starter motor becomes higher than a predetermined permissible maximum temperature, the starter motor is stopped and its operation is prohibited until the starter motor is cooled down to a certain temperature.

More particularly, the operating current of the starter motor is measured periodically with predetermined intervals. A temperature rise of the starter motor from a previously estimated temperature is determined based on the periodically measured operating current, and a present operating temperature is estimated by adding the temperature rise to the previously estimated temperature. The estimated temperature is compared with the predetermined maximum temperature. When the estimated temperature reaches the level of the maximum temperature, the starter operation is compulsorily stopped and prohibited for a certain period. During the prohibiting period, temperature drop of the starter motor is estimated, and when the estimated temperature becomes lower than a predetermined level, the starter motor is allowed to be operated again. Alternatively, the prohibiting period is set by a timer, or by changing the level of the maximum temperature to a lower level for a period in which the starter is cooled down to a certain temperature level.

According to the present invention, the temperature rise in the starter motor during the backward drive is limited to a level that is not detrimental to the starter motor. At the same time, chattering phenomenon in which the starter motor is repeatedly turned on and off is prevented, because the operation prohibiting period is provided after the starter motor is once compulsorily stopped. Since the operating temperature of the starter motor is estimated based on the current supplied to the starter motor, a temperature sensor for measuring the operating temperature is not necessary.

Other objects and features of the present invention will become more readily apparent from a better understanding of the preferred embodiments described below with reference to the following drawings.

DETAILED DESCRIPTION OF THE PREFERRED EMBODIMENTS (First Embodiment)

Figure 1:
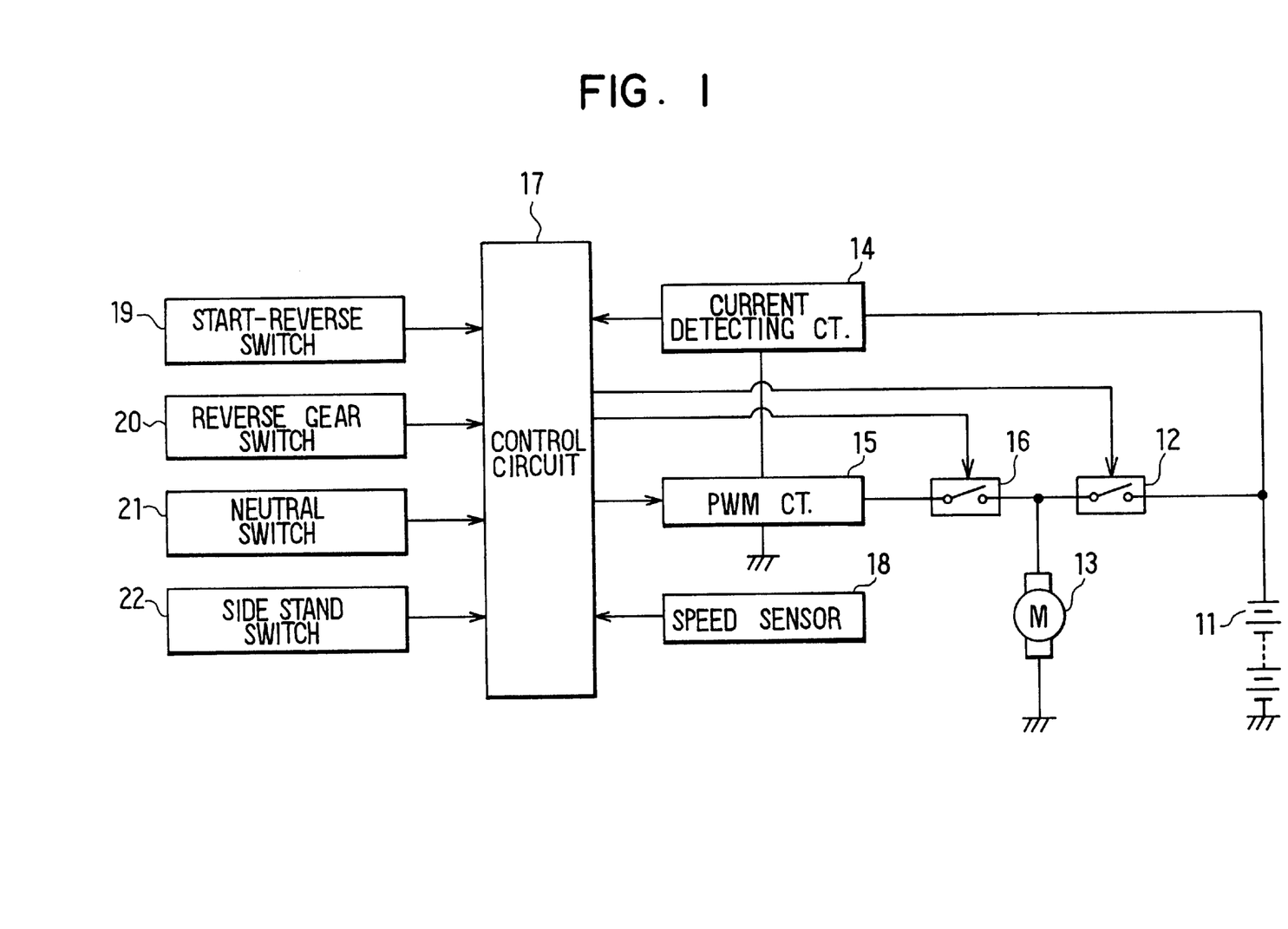
FIG. 1 is a diagram showing a whole system for controlling a backward drive of a motorcycle.
Figure 2:
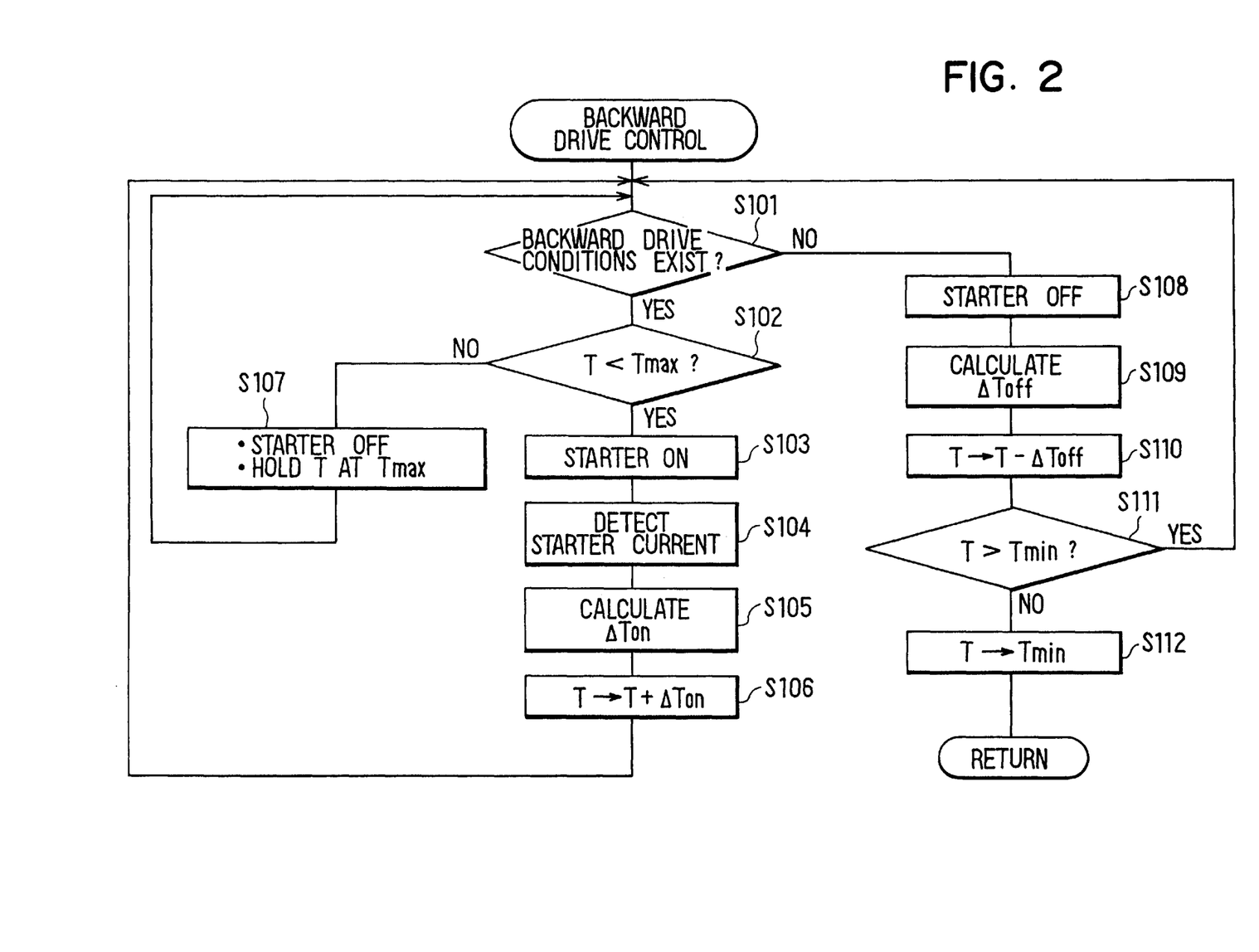
FIG. 2 is a flowchart showing a backward drive control process as a first embodiment.
Figure 3:
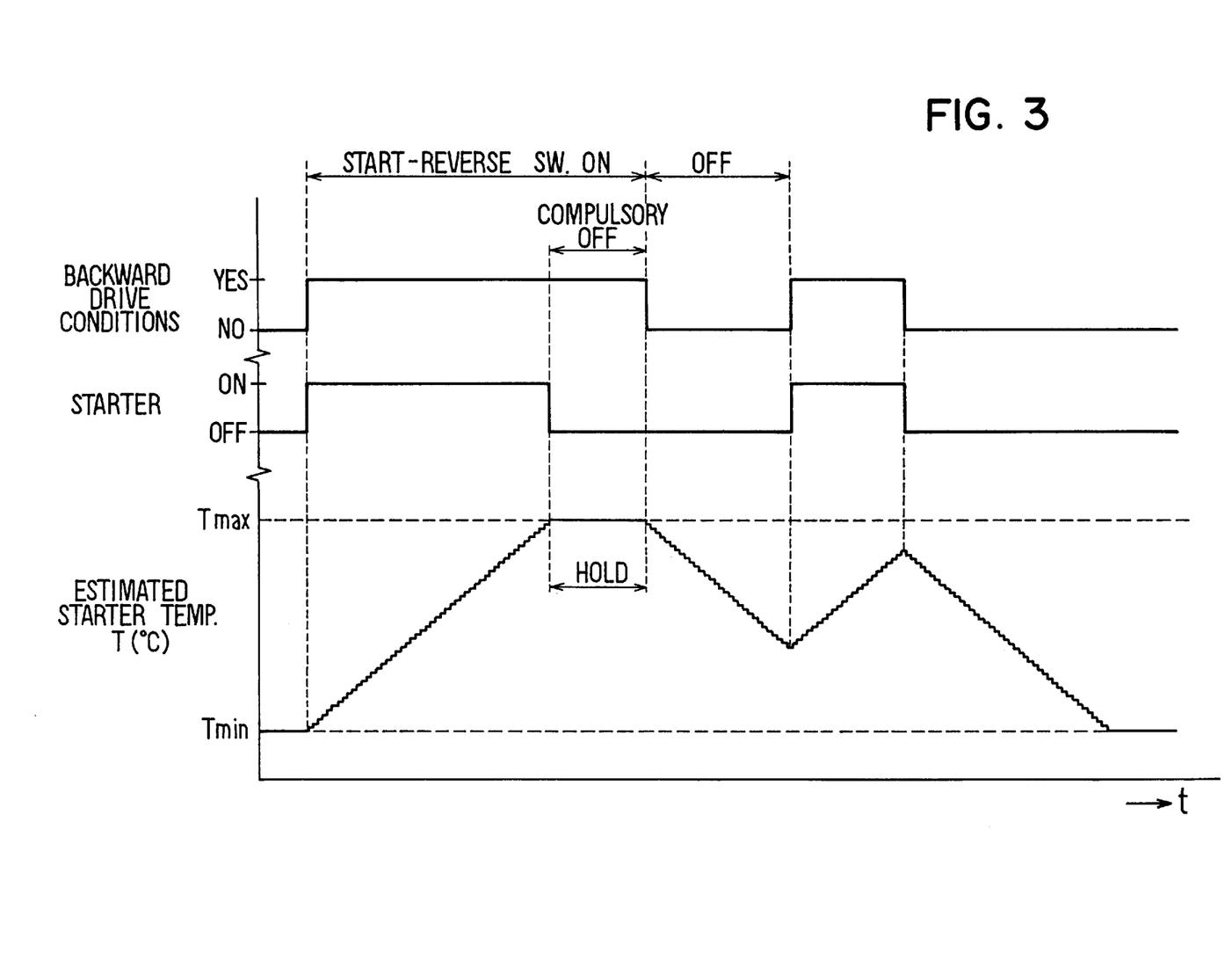
FIG. 3 is a graph showing an example of backward drive control according to the process shown in FIG. 2.

A first embodiment of the present invention will be described with reference to FIGS. 1, 2 and 3. FIG. 1 shows a whole structure of a system for controlling backward drive of a motorcycle. A starter motor 13 is connected to a plus terminal of a battery 11 via a starter relay 12. A pulse width modulation circuit (a PWM circuit) 15 is connected to the plus terminal of the battery 11 via a current detecting circuit 14. An output side of the PWM circuit 15 is connected to the starter motor via a reverse relay 16. In other words, power to drive the starter motor 11 is supplied through two circuits, namely, one from the battery 11 to the starter motor 13 via the starter relay 12, and the other from the battery 11 to the starter motor 13 via the current detecting circuit 14, the PWM circuit 15 and the reverse relay 16. The starter relay 12 is a normally open relay and closed only when the battery power is supplied to the starter 13 to start up an engine (not shown). When the motorcycle is driven backward, the battery power is supplied to the starter 13 by closing the normally open reverse relay 16, and current supplied to the starter 13 is detected by the current detecting circuit 14. A signal corresponding to the detected current is fed to a control circuit 17.

A sensor and switches are connected to the control circuit 17 to feed signals to the control circuit 17. The sensor and switches connected to the control circuit 17 are: a speed sensor 18 for detecting speed of backward drive; a start-reverse switch 19 for sending signals to crank up the engine or to drive the motorcycle backward; a reverse gear switch for detecting a position of a reverse gear (not shown) that is manually shifted to drive the motorcycle backward; a neutral switch 21 for detecting a neutral position of a transmission (not shown); a side-stand switch 22 for detecting a position of a side-stand (not shown).

The control circuit 17 controls the operation of the starter 13 based on signals fed from the speed sensor 18 and switches 19–22 in the following manner. The starter 13 is driven to crank up the engine by closing the starter relay 12, when the neutral switch is ON (the transmission is at the neutral position) and the start-reverse switch 19 is turned ON;

or when the side-stand switch 22 is ON (the side-stand is lifted), the reverse gear switch 20 is OFF (the reverse gear is not connected) and the start-reverse switch 19 is turned ON.

On the other hand, "backward drive conditions" exist, for example, when the neutral switch 21 is ON, the side-stand switch 22 is ON, the reverse gear switch 20 is on and the start-reverse switch 19 is turned ON. The starter 13 is driven to drive the motorcycle backward by closing the reverse relay 16 when the backward drive conditions exist. Current to drive the motorcycle backward is supplied from the PWM circuit 15 that is controlled by the control circuit 17. During a period in which the motorcycle is driven backward, current supplied to the starter motor 13 is detected by the current detecting circuit 14, and signal representing the detected current is fed to the control circuit 17. The speed of the backward drive is detected by the speed sensor 18 and a signal representing the backward drive speed is fed to the control circuit 17. The PWM circuit 15 is controlled by the control circuit 17 based on the detected current and the detected backward drive speed. Thus, the rotational speed of the starter 13 is controlled. In the backward drive, a driving train of the motorcycle is connected to the starter motor 13 via the reverse gear that is manually shifted, and thus, the starter motor 13 drives the motorcycle backward.

Referring to a flowchart shown in FIG. 2, a control process of the backward drive will be described. The control circuit 17 includes a microcomputer and a ROM that stores a backward drive control program. Upon stating the program, whether or not the "backward drive conditions" exit is first determined at step S101. If the conditions exist, an estimated operating temperature T of the starter motor 13 is compared with a predetermined permissible maximum temperature Tmax at step S102. The estimated temperature T is set at Tmin (a predetermined lowest temperature) upon turning on an ignition switch (not shown) of the motorcycle. If the estimated temperature T is lower than Tmax, the program proceeds to step S103. At step S103, the reverse relay 16 is turned on to drive the starter 13, and the motorcycle is driven backward. At the next step S104, the driving current of the starter 13 is detected by the current detecting circuit 14. The current detection is performed with predetermined intervals in a range of 2–100 milliseconds.

At step S105, $\Delta T_{on}$ that is a temperature rise from a previously estimated temperature T is determined based on the detected starter motor current at step S104. In determining the temperature rise $\Delta T_{on}$, a map or a function formula that is predetermined according to experiments or simulation and pre-stored in the ROM of the control circuit 17 is used. It is possible to take ambient temperature, coolant temperature and the like into consideration in determining the temperature rise $\Delta T_{on}$. At the next step S106, the estimated temperature T at present is calculated by adding the temperature rise $\Delta T_{on}$ to the previously estimated temperature T, namely, T(present)=T(previous)+$\Delta T_{on}$. Then, the program returns to step S101, and the routine is repeated. In this manner, the starter current is detected in every predetermined period, and the operating temperature of the starter 13 is estimated based on the detected starter current.

When the present starter temperature T thus estimated reaches the permissible maximum temperature Tmax, the answer from step S102 turns to "NO", and the program proceeds to step 107. At step S107, current supply to the starter motor 13 is compulsorily turned off by opening the reverse relay 16, and the estimated starter temperature T is fixed at the level of Tmax. Then, the program returns to step S101. The permissible maximum temperature Tmax is preset at a level that is a little lower than a level at which the starter motor 13 is actually damaged due to an excessive temperature rise.

Once the estimated temperature T is fixed at the level of Tmax at step S107, the program repeats the routine consisting of steps S101, S102 and S107 as long as the backward drive conditions exist, and thereby the estimated temperature T is kept at Tmax and the current supply to the starter 13 is prohibited.

On the other hand, if the start-reverse switch 19 is turned off by a driver during the period in which the starter motor is being operated or the starter motor operation is being prohibited, it is determined that backward drive conditions are not in existence at step S101, and thereby the program proceeds to step S108. At step S108, the starter motor is turned off or is continuously kept at the turned-off state, and then the program proceeds to the next step S109. At step S109, a temperature drop $\Delta T_{off}$ after a previous estimation of temperature T is determined. The temperature drop $\Delta T_{off}$ may be determined, for example, based on a difference between ambient temperature and the estimated temperature T, or based on coolant temperature, according to a map or a function formula stored in the ROM. Alternatively, a fixed value may be used as the temperature drop $\Delta T_{off}$. At a step S110, a present estimated temperature T is calculated by subtracting the temperature drop $\Delta T_{off}$ from a previously estimated temperature T, namely, T(present)=T(previous)−$\Delta T_{off}$. Then, at the next step S112, it is determined whether the estimated temperature T is still higher than the lowest temperature Tmin. If T is still higher than Tmin, the program returns to step S101 and the routine from step S101 to step S111 is repeated until the estimated temperature T reaches the level of Tmin. When the estimated temperature T reaches Tmin, the answer from step S111 turns to NO, and the program proceeds to the next step S112. At step S112, the estimated temperature T is guarded at the level of Tmin not to be lowered beyond that level, and the program returns. The lowest temperature Tmin may be set at a constant level, or it may be varied according to ambient temperature, coolant temperature or the like.

An example of the backward drive control performed under the program described above will be explained, referring to the timing chart shown in FIG. 3. When the backward drive conditions exist, power supply to the starter motor 13 is initiated. During the period in which the starter motor 13 is operated, the starter current is detected at every predetermined time, and the temperature rise $\Delta T_{on}$ is determined based on the detected starter current. A present estimated temperature T(present) of the starter is determined by adding the temperature rise $\Delta T_{on}$ to a previously estimated temperature T(previous). This process is repeated until the estimated temperature T reaches the permissible maximum temperature Tmax. When T reaches Tmax, the power supply to the starter 13 is compulsorily terminated to protect the starter from being excessively heated. At the same time, the estimated temperature T is fixed at the level of Tmax, so that the starter operation is prohibited until the starter is cooled off to a certain level, even if the start-reverse switch 19 is continuously kept turned on. Thus, a chattering phenomenon, under which the starter is turned on and off repeatedly after it is once turned off, is prohibited.

When the start-reverse switch 19 is turned off during the period in which the starter operation is prohibited, the prohibition of the starter operation is canceled because the backward drive conditions do not exist anymore. Then, the estimated temperature T, during the period the starter motor is not being operated, is gradually lowered by subtracting the temperature drop $\Delta T_{off}$ at predetermined timing. When the estimated temperature T reaches the lowest temperature Tmin, it is guarded at Tmin.

Though the compulsorily prohibiting period (a period after the estimated temperature T reaches Tmax and until the backward drive conditions vanish) is realized to keep the estimated temperature T at the level of the maximum temperature Tmax in the Embodiment described above, it may be realized by fixing the reverse relay at its off position. If the reverse relay 16 is fixed at the off position during the prohibiting period, the estimated temperature T has not to be kept at Tmax, but it is lowered according to lapse of time in the same manner as in a normal non-operation period of the starter motor.

(Second Embodiment)

Figure 4:
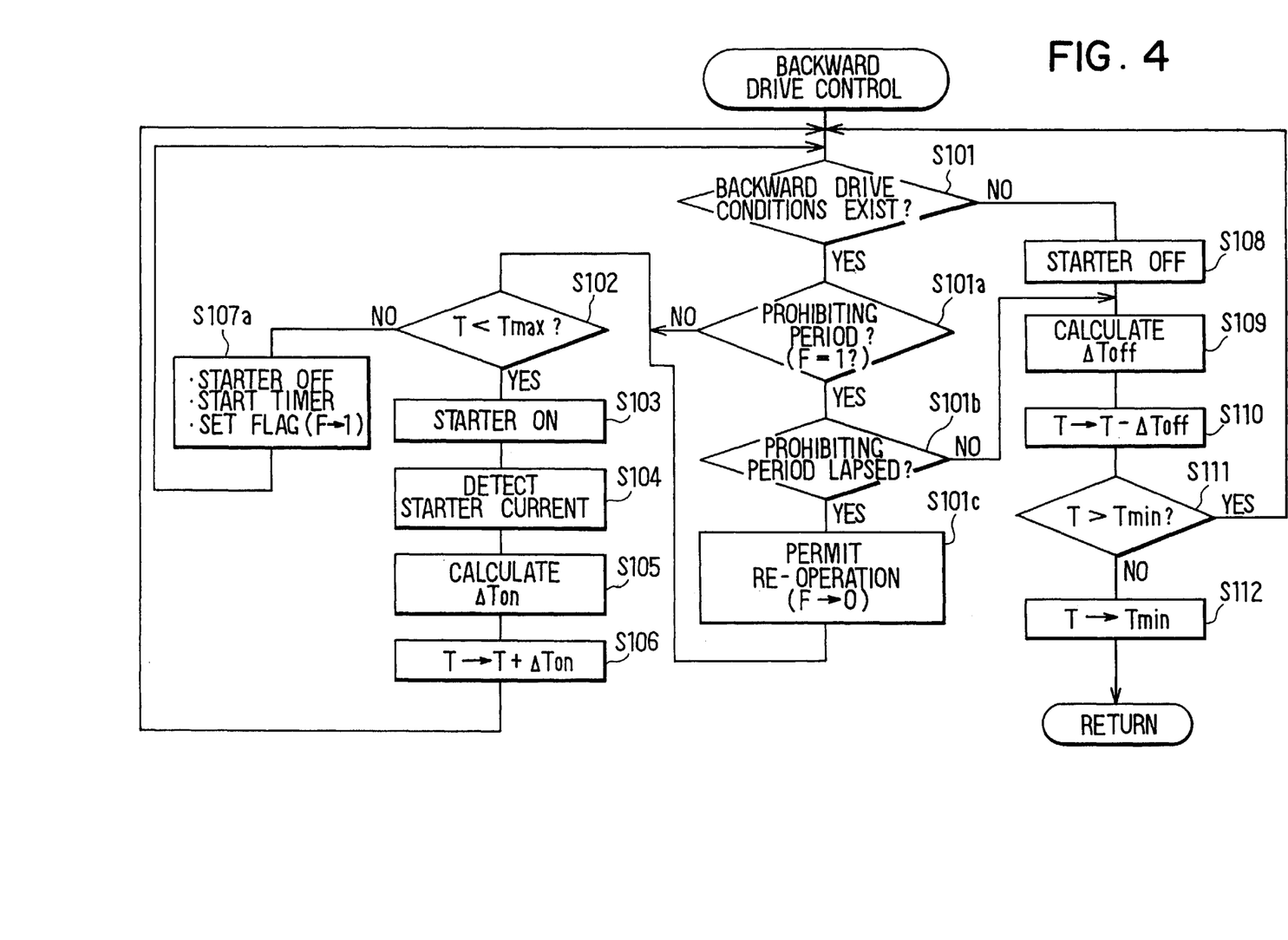
FIG. 4 is a flowchart showing a backward drive control process as a second embodiment.
Figure 5:
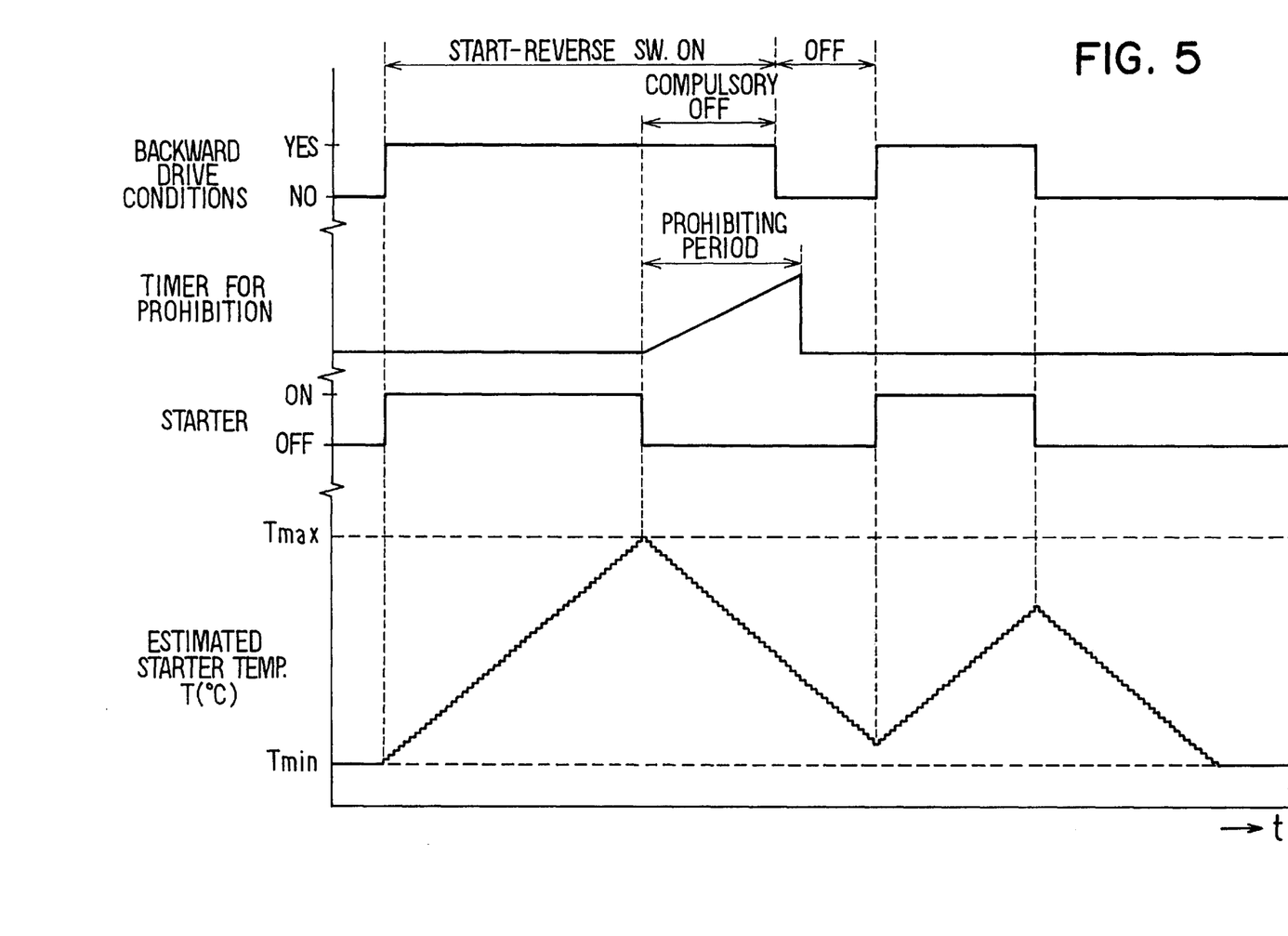
FIG. 5 is a graph showing an example of backward drive control according to the process shown in FIG. 4.

Referring to FIGS. 4 and 5, a second embodiment of the present invention will be described. In this embodiment, the period for compulsorily prohibiting the starter operation to drive the motorcycle backward, after the estimated operating temperature T of the starter reaches the maximum temperature Tmax, is realized by a timer which sets a predetermined period of time.

Referring to FIG. 4 showing a control process of the second embodiment, steps S101a, S101b and S101c are additionally inserted between steps S101 and S102. Also, step S107 is changed to step S107a. Other steps are the same as those shown in FIG. 2, and the control process is similarly performed. Under the program shown in FIG. 4, whether the process is in the prohibiting period or not is determined at step S101a (if the process is in the prohibiting period, a flag is 1, and if not, the flag is 0). If the process is not in the prohibiting period, the program proceeds to step S102. At step S102, whether the estimated starter temperature T is lower than the maximum temperature Tmax is determined. If T is lower than Tmax, the program proceeds to step S103, and the starter motor is operated. Then, the program proceeds through steps S103–S106 in the same manner as in the first embodiment. When the estimated temperature T reaches Tmax, the program proceeds from step S102 to step S107a. At step S107a, the starter operation is compulsorily turned off, and a timer is started to set a period in which the starter operation is continuously kept prohibited (the flag is set to 1). Then, the program returns to step S101.

If it is determined that the process is in the prohibiting period at step S101a, the program proceeds to step S101b. At step S101b, whether the predetermined period for prohibiting the starter operation has lapsed or not is determined from the count of the timer. If not, the program proceeds to step S109, and thereafter the estimated temperature T is lowered in the same manner as in the first embodiment. When it is determined that the predetermined prohibiting period has lapsed at step S101b, the program proceeds to step S101c. At step S101c, the prohibition of the starter operation is canceled to allow the starter to be operated again (the flag is reset to 0), end the program returns to step S102.

An example of the backward drive control performed under the program described above will be explained, referring to FIG. 5. When the estimated temperature T reaches the maximum temperature Tmax, the timer is set to prohibit the starter operation for a predetermined period of time. During the prohibiting period the starter operation cannot be resumed, irrespective of closing or opening operation of the start-reverse switch 19. The estimated temperature T is not held at the level of Tmax, instead, it is gradually lowered after it reached Tmax, as shown in the bottom graph in FIG. 5. The starter operation can be resumed when the backward drive conditions exist after the prohibiting period has lapsed.

(Third Embodiment)

Figure 6:
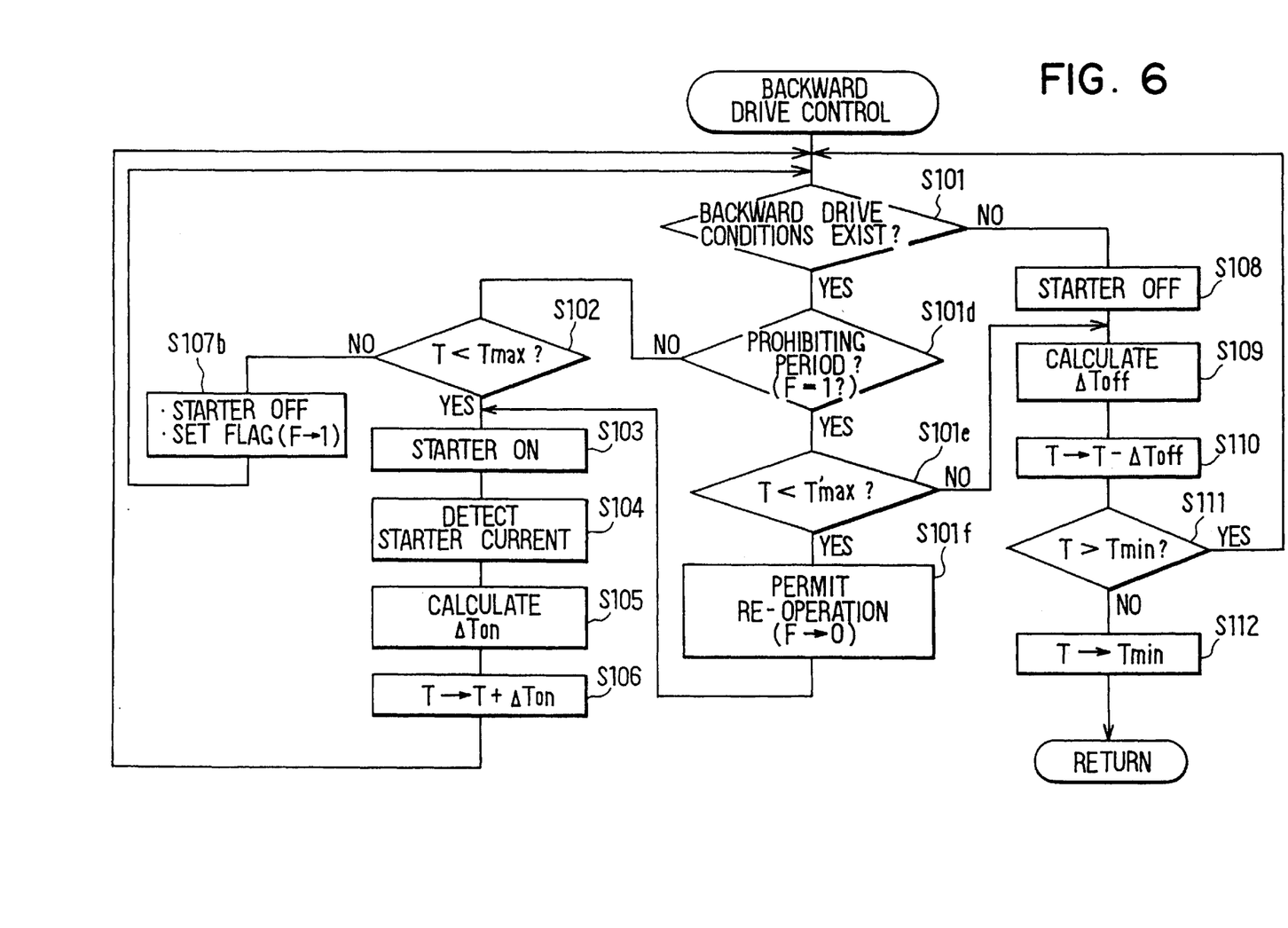
FIG. 6 is a flowchart showing a backward drive control process as a third embodiment.
Figure 7:
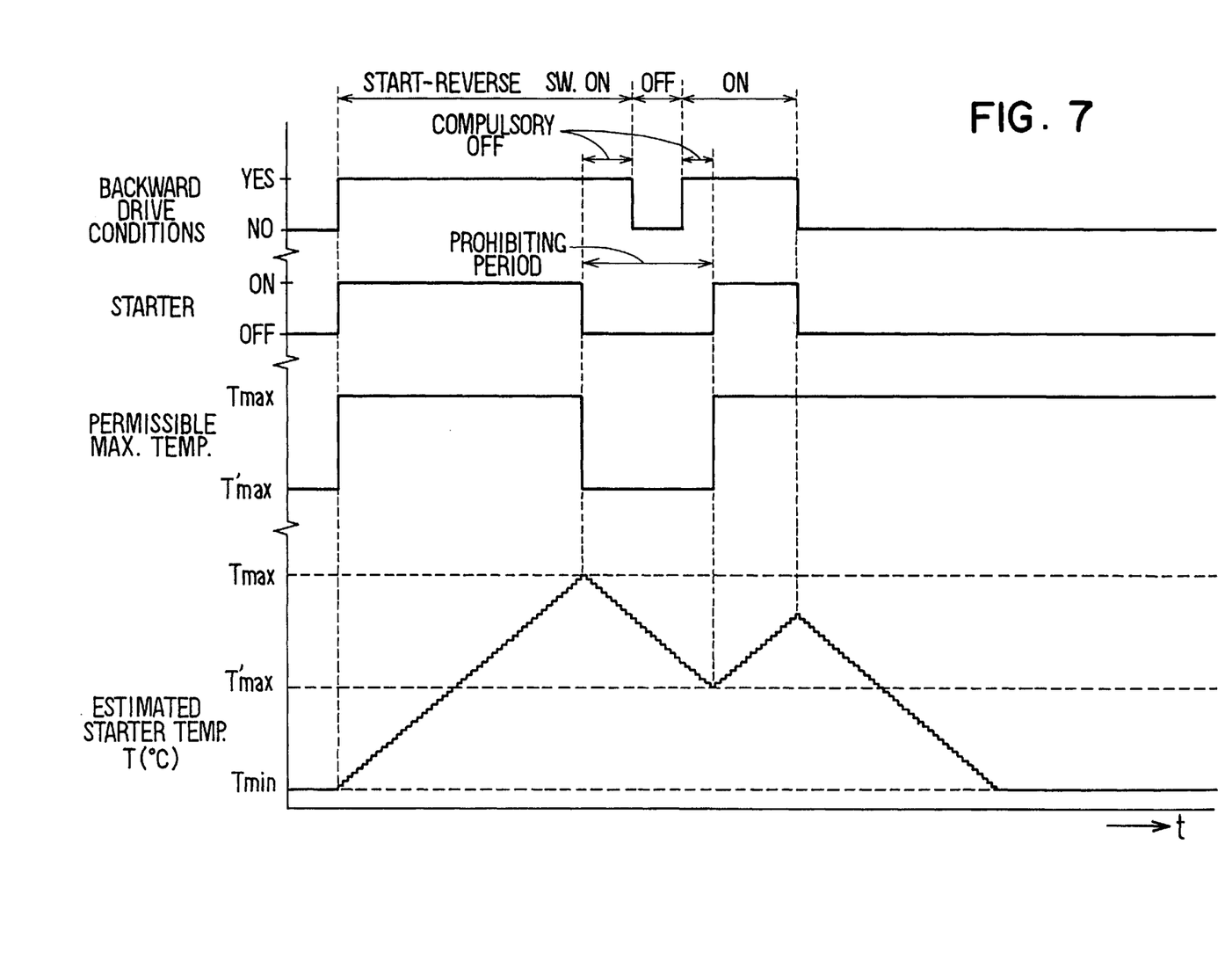
FIG. 7 is a graph showing an example of backward drive control according to the process shown in FIG. 6.

Referring to FIGS. 6 and 7, the third embodiment of the present invention will be described. In this embodiment, the predetermined maximum temperature Tmax is changed to T'max (T'max is lower than Tmax) when the estimated starter temperature T reaches Tmax, and T'max is changed to Tmax again when the estimated temperature T is lowered to the level of T'max. In this manner, the starter operation is compulsorily prohibited after the estimated temperature T reaches Tmax and until it is lowered to the level of T'max. In other words, a hysteresis is provided in the level of the permissible maximum temperature.

A backward drive control program of the third embodiment is shown in FIG. 6. In this program, steps S101d, S101e and S101f are added between steps S101 and S102 in the program shown in FIG. 2, and step S107 is changed to step S107b. Other steps are the same as those in the program shown in FIG. 2. When the backward drive conditions exist, the program proceeds from step S101 to step 101d. At step S101d, whether the control process is in the period of prohibiting the starter operation or not is determined. If the control process is not in the prohibiting period (F=0), the program proceeds to step S102. If it is determined that the estimated temperature T is lower than Tmax at step S102, the program proceeds to step S103 where the starter is operated by supplying power thereto. When the estimated temperature T reaches the maximum temperature Tmax by operating the starter motor, the program proceeds from step S102 to step S107b. At step S107b, the starter operation is compulsorily shut off, and the flag (F=1) indicating the prohibiting period is set. Then, the program returns to step S101.

If it is determined that the control process is in the prohibiting period (F=1) at step S101d, the program proceeds from step S101d to step S101e. At step S101e, the estimated temperature T is compared with T'max that is lower than Tmax. If T is higher than T'max, the program proceeds to step S109 and other steps following step S109, and thereby the estimated temperature T is lowered according to lapse of time in the same manner as in the first embodiment. The level of T'max may be a predetermined fixed value, or it may be changed according to ambient temperature, intake air temperature or coolant temperature. When the estimated temperature T is lowered to the level of T'max, the program proceeds from step S101e to step S101f. At step S101f, the prohibiting period is terminated (F=0), and the starter is allowed to be operated again. Then, the program proceeds to step S103 and other steps following step S103 in the same manner as in the first embodiment.

An example of the backward drive control performed under the program shown in FIG. 6 is illustrated in the timing chart of FIG. 7. When the estimated temperature T reaches the permissible maximum temperature Tmax, the level of maximum temperature is lowered to T'max, and the starter operation is compulsorily prohibited until T is lowered to T'max. When T is lowered to the level of T'max, the maximum level of temperature is changed again from T'max to Tmax, and the prohibiting period is terminated. During the prohibiting period, the starter operation is not allowed even if the start-reverse switch 19 is operated to close the same. The estimated temperature T is not held at the level of Tmax when T reaches Tmax, instead T is lowered gradually as time lapses in the same manner as in the second embodiment.

Since the operating temperature of the starter motor 13 is estimated based on the current supplied thereto in the foregoing embodiments, a temperature sensor is not necessary, and accordingly the control system is simple and inexpensive. However, a temperature sensor may be used in the system to directly detect the operating temperature. Though the operating temperature is estimated based on the starter current that is periodically measured with predetermined intervals, an operating current that is supplied to the starter motor at the beginning of its operation may be used in estimating the operating temperature. In this case, the temperature rise determined by the current at the beginning has to be integrated during the operation of the starter motor. The "backward drive conditions" described above may be modified. For example, some other conditions may be added, or part of the conditions may be eliminated. The memory storing the program is not limited to the ROM contained in the control circuit 17, but other nonvolatile memories such as an external EPROM or an EEPROM may be used. The position of the current detecting circuit 14 in the control system is not limited to the position shown in FIG. 1, but it may be placed at other positions as long as it detects the current supplied to the starter motor for driving the motorcycle backward.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A backward drive control system for a motorcycle, the motorcycle being able to be driven backward by operation of a starter motor, the control system comprising:
   means for estimating operating temperature of the starter motor; and
   means for compulsorily stopping operation of the starter motor when the estimated operating temperature reaches a predetermined maximum temperature.

2. The backward drive control system as in claim 1, wherein:
   the estimating means includes a current detector for detecting current supplied to the starter motor during the backward drive; and
   the estimating means calculates the operating temperature of the starter motor based on the current detected by the current detector.

3. The backward drive control system as in claim 2, wherein:
   the current detector detects the current periodically with predetermined intervals during the backward drive; and
   the estimating means determines a temperature rise in the operating temperature based on the periodically detected current and estimates the operating temperature at present by adding the temperature rise to the operating temperature previously estimated.

4. The backward drive control system as in claim 2, wherein:
   the estimating means further includes means for lowering the estimated operating temperature according to time lapsed after the starter motor is turned off.

5. The backward drive control system as in claim 1, wherein:
   the compulsorily stopping means further includes means for compulsorily prohibiting operation of the starter motor for a certain period of time after the starter motor is compulsorily stopped.

6. The backward drive control system as in claim 5, wherein:
   the period for compulsorily prohibiting operation of the starter motor starts at a time when the starter motor is compulsorily stopped and continues until a switch for operating the starter motor is turned off.

7. The backward drive control system as in claim 5, wherein:
   the estimated operating temperature of the starter motor is fixed to and maintained at a level of the predetermined maximum temperature during the period for compulsorily prohibiting operation of the starter motor.

8. The backward drive control system as in claim 5, wherein:
   the means for compulsorily prohibiting operation of the starter motor includes means for changing the predetermined maximum temperature to a lower level when the estimated operating temperature reaches the predetermined maximum temperature and for restoring the predetermined maximum temperature when the estimated operating temperature is lowered to or below the lower level, so that operation of the starter motor is prohibited during a period from a time when the predetermined maximum temperature is changed to the lower level and to a time when the predetermined maximum temperature is restored.

9. A backward drive control system for a motorcycle, the motorcycle being able to be driven backward by operation of a starter motor, the control system comprising:
   a pulse width modulation circuit for supplying driving current to the starter motor to drive the motorcycle backward in a controlled manner;
   a current detecting circuit for detecting the driving current supplied to the starter motor;
   means for estimating operating temperature of the starter motor based on the detected driving current; and
   means for compulsorily turning off the driving current when the estimated operating temperature of the starter motor reaches a predetermined permissible maximum temperature.

10. The backward drive control system as in claim 9, wherein:

the compulsorily turning off means holds the estimated operating temperature at the same level as the predetermined permissible maximum temperature for a predetermined period after the estimated operating temperature reached the level of the predetermined permissible maximum temperature, so that the starter motor is kept turned-off during the predetermined period.

11. The backward drive control system as in claim 9, wherein:

the compulsorily turning off means includes a timer for setting a period for prohibiting supply of the driving current to the starter motor after the estimated operating temperature of the starter motor reached the predetermined permissible maximum temperature.

12. The backward drive control system as in claim 9, wherein:

the compulsorily turning off means changes a level of the predetermined permissible maximum temperature to a lower level for a certain period after the estimated operating temperature of the starter motor reached the predetermined permissible maximum temperature to keep the starter motor turned-off for that period.

* * * * *